UNITED STATES PATENT OFFICE.

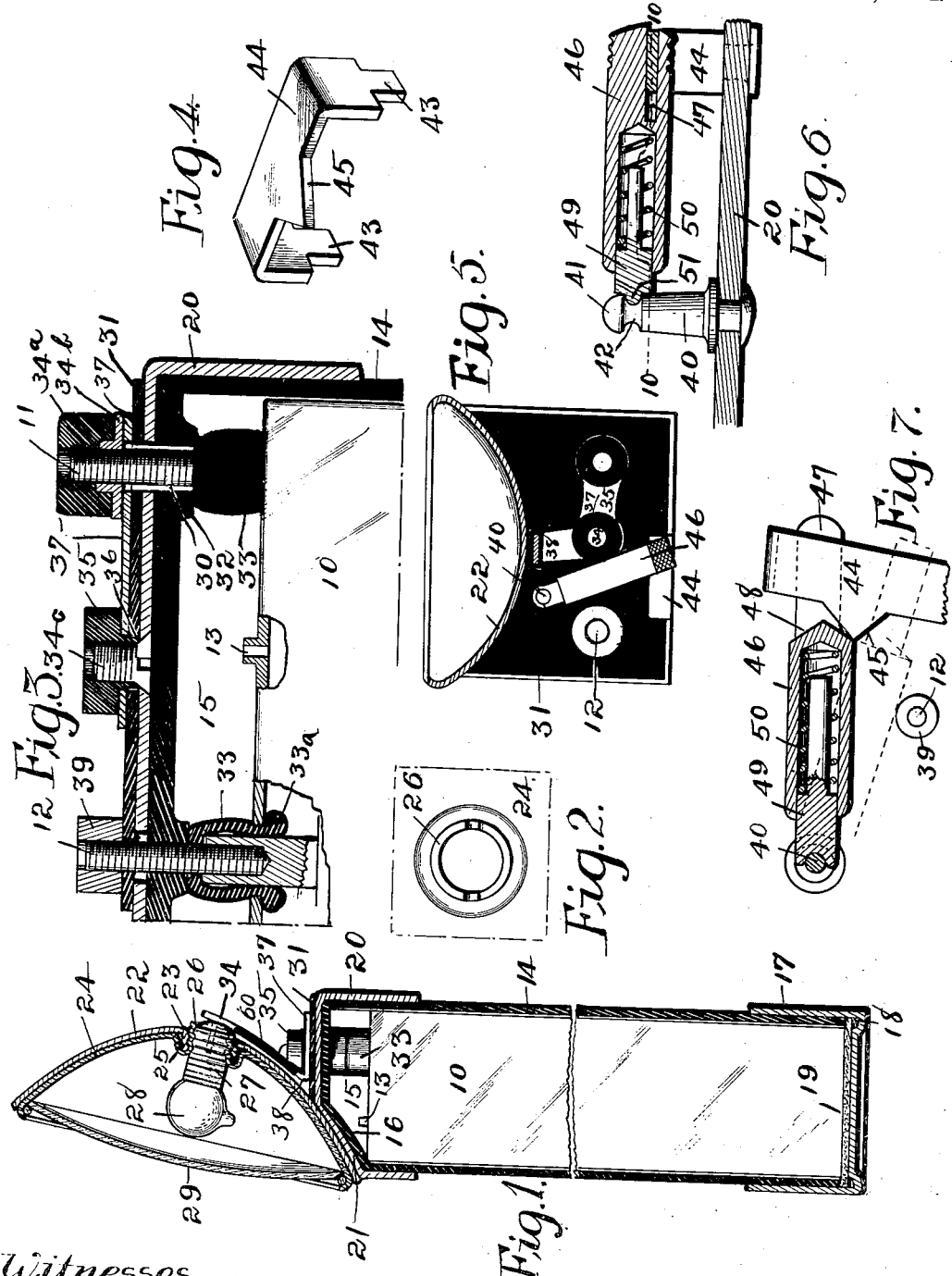

ERNEST A. HOOPES, OF DES MOINES, IOWA.

ELECTRIC HAND-LAMP AND CASING.

1,086,710.  Specification of Letters Patent.  Patented Feb. 10, 1914.

Application filed July 5, 1910. Serial No. 570,222.

*To all whom it may concern:*

Be it known that I, ERNEST A. HOOPES, a citizen of the United States, residing at Des Moines, in the county of Polk and State of Iowa, have invented a certain new and useful Electric Hand-Lamp and Casing, of which the following is a specification.

The object of my invention is to provide an electric hand lamp of simple, durable and inexpensive construction designed to contain a storage battery and also designed to be conveniently and easily held in an operator's hand.

More specifically it is my object to provide a hand lamp for storage batteries in which the gas arising from the storage battery may escape without permitting the liquid of the battery to escape.

Other objects will appear in the following description.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a vertical, central, sectional view of same, the battery and its container being shown in the side elevation. Fig. 2 shows an enlarged, detail, rear view of the screw threaded socket of the reflector. Fig. 3 shows an enlarged, detail, sectional view illustrating the battery terminals, the metal cap for the lamp body portion and the means for electrically connecting and insulating the terminals. Fig. 4 shows an enlarged, detail, perspective view of the stationary switch guide. Fig. 5 shows a top or plan view of the lamp to illustrate the terminals and switch, the reflector holder being shown in section. Fig. 6 shows an enlarged, detail, sectional view of the switch, and Fig. 7 shows a top or plan view of the switch and the switch guide. The dotted lines in said figure illustrate the position of the switch when the circuit is closed, said view being taken on the dotted lines 10—10 of Fig. 6.

Referring to the accompanying drawings, I have used the reference numeral 10 to indicate generally the casing of a storage battery, which casing is preferably composed of insulating material, such, for instance, as hard rubber or celluloid. Within the cas-ing 10 are the ordinary materials for forming a storage battery and I shall hereafter refer to the casing 10 and to its contents as a cell. The top of the casing is provided with two terminally screw-threaded rods 11 and 12. The casing 10 is preferably rectangular in cross section and is provided with a small vent opening 13 at its top.

The lamp in which the battery is contained comprises a casing which is made of an insulating material, such, for instance, as hard rubber or celluloid and which comprises a rectangular body portion 14 open at its lower end and of such size that the battery cell may be telescopically connected therewith in such a manner that it may be frictionally held within the casing 14. The casing is made slightly higher than the top of the battery to provide a space 15 between the top of the battery and the casing. The front side of the casing at its top above the battery is preferably provided with a concave portion at 16 to receive the reflector frame hereinafter described. In connection with the battery cell and the casing just described, I obtain the following advantageous result: By thus telescopically connecting said parts, the gas under pressure that accumulates in the space 15 will pass out and downwardly between the cell and the casing, and in addition to this if any liquid escapes from the battery into the space 15 it will flow part way down between the cell and the casing but on account of its capillary attraction with both the cell and the casing it will not flow down to the lower end of the cell. Hence, by this simple arrangement I have provided a battery and casing in which the gas that is generated within the battery may escape and yet the liquids from the battery will be held between the walls of the cell and the casing so that the liquids will not flow out. In this connection I have provided an additional means for preventing the escape of the battery liquids as follows: On the bottom of the casing 14, I provide a metal cap 17 designed to fit the lower end of the casing enough to be frictionally held thereon but not to wholly prevent the escape of gas. The lower portion of the cap is preferably provided with a reinforcing rib 18 extending all around the edges of the bottom and on top of the bottom of the cap is an absorbent layer 19, the function of which is to receive any liquid that may possibly flow out between the cell and the casing and to absorb said liquid before it can come in contact with the cap 17. In this connection I have also provided for chemically treating the said absorbent material with carbonate of soda, bicarbonate of soda, or other suitable neutralizing agent, so that it will neutralize the acid liquid from the battery and prevent said acid from corroding the metal cap 17. This absorbent material may be thus treated by any of the ordinary solutions that will counteract the effect of acid.

On top of the casing I have provided a metal cap 20 similar to the cap 17 and designed to be tightly fitted on the top of the casing and being provided near its front with a concave portion at 21 to receive the reflector frame and to fit into the concave portion 16 of the top of the casing. Fitted into this concave portion 21 is the reflector frame 22 which is preferably made of sheet metal and which is terminally connected to the cap 20. This casing has an opening 23 at its rear central portion and is opened at at its front. I preferably so position this frame 22 that its front edge will incline upwardly and rearwardly at an acute angle relative to the vertical axis of the casing. Mounted within this frame 22 is the reflector 24. This reflector is preferably made of a single piece of sheet metal with an opening at its central portion. The material surrounding said opening at the central portion is shaped by means of a spinning process or by dies so that it has a forwardly projecting portion at 25 and a rearwardly extended sleeve-like portion 26, the latter being screw threaded so that it will screw into the screw threaded opening 23 of the frame 22 and also so that it will receive the screw threaded socket 27 of an electric lamp bulb 28. I preferably slot the opposite sides of the part 26 so that the resiliency of the metal will yieldingly engage the lamp bulb and thus prevent it from becoming unscrewed when the lamp is handled. The advantage of having a part 24 extended forwardly and then the sleeve 26 extended rearwardly is that I provide a comparatively long socket or sleeve for the lamp bulb and at the same time provide a compact reflector in which the central portion does not project to any great extent in the rear of the reflector frame 22. A reflector crystal 29 is fitted in the front of the reflector in an ordinary manner. By this arrangement the reflector is detachably connected to the frame and it may be easily unscrewed and removed from the frame.

I provide for electrically connecting the bulb 28 with the terminal 11 of the battery as follows: Formed in the casing 14 is an opening 30 through which the terminal 11 is extended. This opening also extends through the cap 20 and also through a layer of insulating material 31 on top of the cap 20. I also preferably provide on the under surface of the top of the casing 14 an annular collar 32 surrounding the opening 30. I also provide for sealing the battery cell 10 and also the casing 20 around the terminal 11 as follows: 33 indicates a soft rubber tube having a small opening at its top through which the upper end of the terminal 11 is extended. This rubber tube is preferably provided at its bottom with a flange extended outwardly at $33^a$ and the body of the tube extends through the battery cell 10. The said tube being flexible is compressed where it passes through the battery cell 10 so that the flange $33^a$ and the body of the tube around the battery cell extend outwardly and firmly seal the battery at the point where the terminal 11 goes through it and the small opening at the top of the tube 33 forms a tight joint around the terminal 11. Mounted on top of the insulating layer 31 is a conductor arm 34 for the electric light bulb. This arm is preferably made complete of a single piece of sheet metal and is provided with an opening to receive the terminal 11. To provide for forming an electrical connection between the terminal 11 and the metal arm 34, I have provided a nut made of a metal part $34^b$ at its bottom and an insulator part $34^a$ at its top so that the metal part is held firmly in engagement with the metal arm 34 and the insulator part prevents short circuiting with the other terminal of the battery by any metallic article that might be laid thereon. The arm 34 is also provided with an opening to receive the short screw $34^c$, the opening therein being somewhat larger than the screw. This screw $34^c$ is extended upwardly through the cap 20 and the insulator layer 31, and I have provided for electrically insulating the screw from the conductor arm as follows: Mounted upon the screw $34^c$ is a nut 35 made of insulating material and provided with an annular collar 36 which is designed to pass through the opening in the conductor arm to thereby space the arm apart from the screw and to interpose an insulator between the arm and the screw. The body portion of the arm through which the terminals 11 and the screw $34^c$ are passed is indicated by the numeral 37 and said arm is provided with an upwardly extended portion 38 to engage the rear end of the electric light bulb where it projects through the reflector. In this connection, I have provided for insulating the upwardly extending portion of said arm by placing a jacket of celluloid or other insulating material on said arm. This jacket extends over the arm beyond the point where the screw $34^c$ passes through it so that said screw and the nut 35 serve to hold the insulating jacket in position on the arm and only the upper end of the arm that engages the electric light bulb is uninsulated. The terminal 12 is extended outwardly through the top of the casing 14 and the cap 20 in the same way as the terminal 11, and on its upper end above the insulator 31 is a metal nut 39 made of material that forms a good conductor.

In order to provide for electrically connecting and disconnecting the terminal 12 with the electric lamp in order to complete and cut off the current through the battery, I have provided an improved switch device as follows: In this connection it is to be understood that the metal cap 20 is electrically connected with the electric lamp bulb through the reflector and the reflector frame. Fixed to the cap 20 is a fulcrumed pin 40 having a rounded head 41 at its top and a rounded annular groove 42 below the head. This pin is made of electrical conducting material. Fixed to the cap 20 at a point spaced apart from the fulcrumed pin 40 is a guide device preferably made of a single piece of metal and having its ends 43 extended through the cap 20 and firmly fixed thereto. This guide has a horizontally arranged top portion 44 provided on one side with a pointed projection 45. The switch proper comprises a cylindrical body portion 46 having a slot 47 at its rear end to receive the guide 40. The body portion of the switch 46 at its rear end is provided within the slot 47 with inclined sides 48 as clearly shown in Fig. 10. The forward end of the switch 46 is formed hollow and a switch member 49 is slidingly mounted therein and is normally held at its forward limit by a spring 50. The projecting end of the part 49 is provided with a rounded notch, as shown in Fig. 10, to receive the fulcrum member 40 and this rounded notch has at its central portion a rounded projecting rib 51 designed to enter the rounded annular groove 42 as clearly shown in Fig. 9. By this arrangement an additional connection is provided between the switch member and the fulcrum pin so arranged that the part 49 will be held in firm contact with the fulcrum pin through both lateral and longitudinal movements of the part 46. The parts of this switch are so arranged and proportioned that, when the switch is at one limit of its movement, the body portion 46 will be firmly held against the metal nut 39 on account of the engagement of the inclined shoulder 48 with the inclined side of the guide lug 45 and when in its other position it will be securely held out of contact with the nut 39 and in moving from one position to the other the said inclined shoulder 48 will engage the inclined sides of the lug 45 and thus cause the body portion 46 to slide forwardly and rearwardly against the spring pressure so that the switch will snap from one position to the other and be firmly held in either position of its movement.

In practical operation it is obvious that the casing for containing the battery cell is of simple and inexpensive construction and is also so arranged that any gases that may be generated by the cell in sufficient quantities to produce an appreciable pressure may readily and easily escape between the telescoped portions of the cell and the casing. Further in the event that liquid should flow out of the vent of the cell said liquids will be prevented from escaping on account of the capillary attraction between the liquid and the adjacent closely fitted walls of the cell and the casing and the escape of such liquid is further prevented by means of the absorbent material in the bottom of the lower cap. Hence the lamp, as a whole, may readily and easily be carried in an operator's pocket and placed in any position without danger of having the acids in the battery pass out to the exterior of the casing and at the same time a casing is provided from which the battery may readily, quickly and easily be detached when it is desired to recharge the battery or for other purposes. By the arrangement of the reflector frame relative to the casing the frame may be firmly and securely supported on the metal cap of the casing in such a position that the lamp may be conveniently and easily held in an operator's hand and the light from the lamp will be thrown straight forwardly. This feature of the lamp makes it especially desirable for use by physicians and others as the lamp may be held in the operator's hand and the operator's eye may be placed close behind the reflector frame and the light may be thrown straight forwardly in such a manner that it may be directed into a patient's throat so that the operator may clearly see the inside of a patient's throat. The arrangement of the reflector within the reflector frame is such that both the reflector and the reflector frame may be readily and easily formed with the screw threaded portions integral therewith and the reflector may be firmly and securely screwed into the reflector frame. Furthermore by slotting the tubular portion of the reflector frame that receives the bulb, the said bulb will be firmly held in position on account of the resiliency of the sides of the tubular portion and by having the tubular portion of the reflector frame extended first forwardly, the lamp is made very compact and the bulb need project in the rear of the reflector frame only a short distance as required to engage with the conductor arm 37. The improved construction of the rubber tubes 33 obviously provides a very simple and inexpensive means for preventing the escape of liquids or gases from the battery cells around the terminals.

I claim as my invention:

1. In a device of the class described, the combination of a cell designed to contain an electric battery having a gas vent in its top and a casing surrounding the cell and slidingly fitted on the cell, said casing being provided with a detachable bottom, the cell and casing being so constructed and proportioned relative to each other that gases under pressure may be forced outwardly between the cell and casing and also so that liquids escaping from the cell will be held between the cell and casing.

2. In a device of the class described, a battery cell formed of yielding material and provided with a vent in its top, a casing for the cell formed of a similar material and open at its bottom, the casing being fitted to the cell in such a manner that it may be readily placed in position on the cell, the said parts being so proportioned relative to each other that gases under pressure between the cell and casing may pass out and also so that liquids between the cell and casing will not flow out on account of capillary attraction.

3. In a device of the class described, the combination of a cell designed to contain an electric battery, having a gas vent in its top and a casing surrounding the cell, slidingly fitted on the cell, the cell and casing being so constructed and proportioned relative to each other that gases under pressure may be forced outwardly between the cell and casing and also so that liquids escaping from the cell will be held between the cell and casing, a cap fitted to the lower end of the casing, and an absorbent material in said cap.

4. In a device of the class described, the combination of a storage battery cell of substantially rectangular shape in cross section and having a vent opening at its top and made of yielding material, a casing shaped to loosely fit the exterior of the cell and open at its bottom and made of a yielding material, a cap slidingly mounted on the lower end of the casing to extend over the sides thereof and a strip of absorbent material within the cap to engage the bottom of the cell and the lower edge of the casing.

5. In a device of the class described, the combination of a storage battery cell of substantially rectangular shape in cross section and having a vent opening at its top and made of a yielding material, a casing shaped to loosely fit the exterior of the cell and open at its bottom and made of a yielding material, a cap slidingly mounted on the lower end of the casing to extend over the sides thereof, and a strip of absorbent material within the cap to engage the bottom of the cell and the lower edge of the casing, said absorbent material being chemically treated with a neutralizer of acid.

Des Moines, Iowa, March 17, 1910.

ERNEST A. HOOPES.

Witnesses:
MARY WALLACE,
MILDRED B. GOLDIZEN.